United States Patent [19]
Matier et al.

[11] 3,914,249
[45] Oct. 21, 1975

[54] 4-(3,4-DICHLOROPHENYL)-2-(METHYLAMINO)-2-IMADAZOLINE

[75] Inventors: William L. Matier; William T. Comer, both of Evansville, Ind.

[73] Assignee: Mead Johnson & Company, Evansville, Ind.

[22] Filed: Oct. 30, 1973

[21] Appl. No.: 411,104

[52] U.S. Cl........ 260/309.6; 260/309.7; 260/465 E; 260/570.5 P; 424/273
[51] Int. Cl.$^2$........................................ C07D 49/34
[58] Field of Search...................... 260/309.6, 309.7

[56] References Cited
UNITED STATES PATENTS
3,821,244   6/1974   Matier et al. ................ 260/309.7 X OTHER PUBLICATIONS
Matier et al., Journ. of Med. Chem., 16, 901–908

Primary Examiner—Ethel G. Love
Attorney, Agent, or Firm—Robert H. Uloth; Robert E. Carnahan

[57] ABSTRACT

The imidazoline 4-(3,4-dichlorophenyl)-2-(methylamino)-2-imidazoline and non-toxic pharmaceutically acceptable acid addition salts thereof are useful as antihypertensive agents. Displacement of the methyl mercapto grouping from 2-methylthio-4-(3,4-dichlorophenyl)-2-imidazoline with methylamine provides the imidazoline of the present invention.

3 Claims, No Drawings

4-(3,4-DICHLOROPHENYL)-2-(METHYLAMINO)-2-IMADAZOLINE

BACKGROUND OF THE INVENTION

The present invention is concerned with 4-phenyl-2-aminoimidazolines and is specifically directed to 4-(3,4-dichlorophenyl)-2-(methylamino)-2-imidazoline and pharmaceutically acceptable acid addition salts thereof.

Certain imidazolines broadly defined as 4-aryl-2-aminoimidazolines are reported to be potential antihypertensive agents according to W. L. Matier, D. A. Owens, and W. T. Comer, Abstracts, 163rd National Meeting of the American Chemical Society (March, 1972). The Matier, et al. publication does not recite any specific imidazoline but is concerned with a brief abstract disclosure dealing with a generalized formula for substituted imidazolines having four different variables. 2-Amino-4-phenyl-2-imidazoline, a specific prior art 4-aryl-2-aminoimidazoline structurally related to the imidazoline of the present invention, is described by H. Wollweber, et al., Med. Chem. Abhandl. Med. Chem. Forschungsstatten, Farbwerke Hoechst, A.G., 7, 256 (1963), CA 61:652f (1964) as a ganglionic stimulant. As an antihypertensive agent, the Wollweber, et al. 2-amino-4-phenyl-2-imidazoline is essentially inactive whereas the structurally related 4-(3,4-dichlorophenyl)-2-(methylamino)-2-imidazoline of the instant invention is a potent antihypertensive agent.

SUMMARY OF THE INVENTION

This invention pertains to a novel imidazoline. More particularly, it relates to 4-(3,4-dichlorophenyl)-2-(methylamino)-2-imidazoline characterized by Formula I

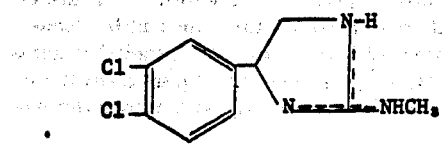

Formula I and non-toxic pharmaceutically acceptable acid addition salts thereof.

The term "non-toxic pharmaceutically acceptable acid addition salt", used herein denotes a salt form of the imidazoline base of Formula I obtained by combination with inorganic or organic acids. Suitable acids which may be used to form a non-toxic pharmacologically acceptable acid addition salt are sulfuric, hydrochloric, phosphoric, hydrobromic, hydroiodic, sulfamic, methanesulfonic, benzenesulfonic, p-toluenesulfonic, acetic, lactic, succinic, maleic, mucic, tartaric, citric, gluconic, benzoic, cinnamic, isethionic, fumaric, and related acids. Preparation of acid addition salts is accomplished in conventional fashion by treating 4-(3,4-dichlorophenyl)-2-(methylamino)-2-imidazoline in an organic solvent, for example ethanol, benzene, ether, chloroform, etc., with the acid. The salt separates directly or can be obtained by concentrating the solution.

The imidazoline of Formula I and its salts can exist in more than one tautomeric modification as illustrated by Formulas (Ia–Ic) which depict various positional tautomers of 4-(3,4-dichlorophenyl)-2-(methylamino)-2-imidazoline base.

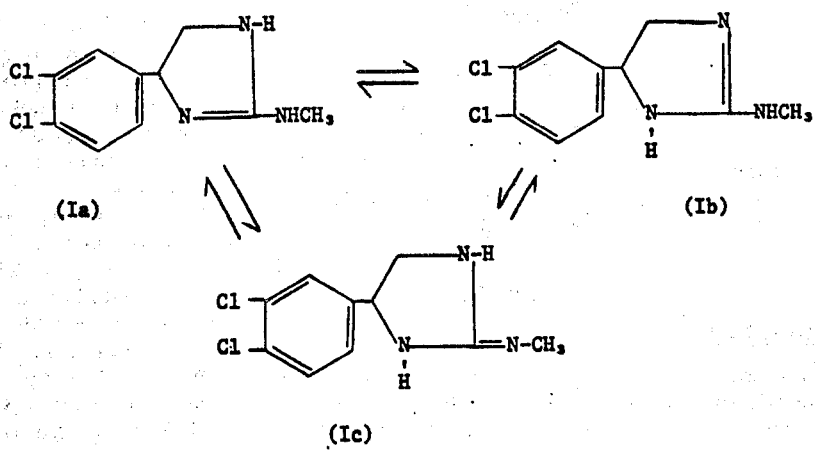

Without being bound by any theory, we believe that the protonated 4-(3,4-dichlorophenyl)-2-(methylamino)-2-imidazoline, as is the case of the acid addition salts, is best represented by a delocalized double bond rather than fixed double bond as shown in the above tautomeric forms. Such a delocalized double bond is illustrated in Formula Id which represents a formula for a salt of 4-(3,4-dichlorophenyl)-2-(methylamino)-2-imidazoline in which X symbolizes an anion.

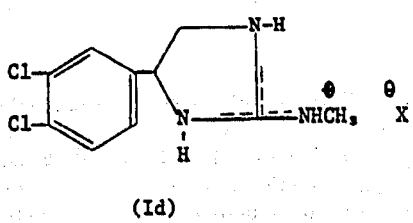

(Id)

Evidence suggesting that the imidazoline double bond in 4-(3,4-dichlorophenyl)-2-(methylamino)-2-imidazoline is delocalized rather than fixed is provided by infrared spectra which clearly shows strong NH absorption in the free amino region (3100–3400 cm.$^{-1}$) rather than in the ammonium region and strong C=N absorption at 1675 cm$^{-1}$. These absorptions are characteristic of a delocalized disubstituted guanidinium ion.

4-(3,4-Dichlorophenyl)-2-(methylamino)-2-imidazoline is obtained by methods described by W. L. Matier, D. A. Owens, W. T. Comer, D. Deitchman, H. C. Ferguson, R. J. Seidehamel, and J. R. Young, J. Med. Chem., 16, 901 (August, 1973) according to the reaction scheme depicted below.

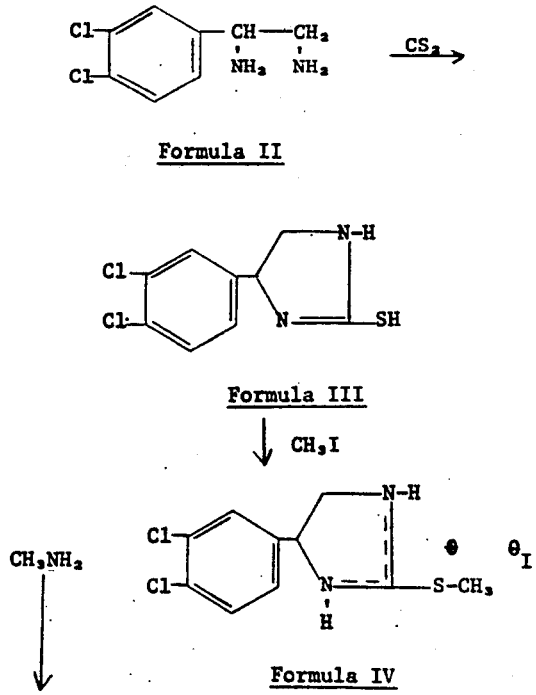

Cyclization of the starting material 1-(3,4-dichlorophenyl)ethylenediamine (Formula II) with carbon disulfide provides 4-(3,4-dichlorophenyl)-2-thio-2-imidazoline (Formula III) which is then methylated with methyl iodide affording 2-methylthio-4-(3,4-dichlorophenyl)-2-imidazoline hydroiodide (Formula IV). Treating 2-methylthio-4-(3,4-dichlorophenyl)-2-imidazoline with methylamine or acid salts thereof such as methylamine hydrochloride results in displacement of the 2-methylthio moiety and formation of the instant imidazoline of the present invention.

Since the imidazoline of Formula I contains an asymmetrically-substituted carbon atom (position 4 of the imidazoline ring), it occurs as a racemic modification and stereoisomeric forms exist. It is to be understood that both dextrorotatory and levorotatory stereoisomers of 4-(3,4-dichlorophenyl)-2-(methylamino)-2-imidazoline as well as the racemate are included within the scope of the present invention. 4-(3,4-Dichlorophenyl)-2-(methylamino)-2-imidazoline racemate can be resolved into optical antipodes according to procedures known to the art such as, by reaction with optically active acids to provide diastereoisomeric salts and separation of these salts according to physico-chemical properties followed by liberation of the optically active bases from the salts.

Another method of providing dextrorotatory and levorotatory stereoisomers of 4-(3,4-dichlorophenyl)-2-(methylamino)-2-imidazoline (Formula II) is to employ optically pure (+) and (−) stereoisomers of 1-(3,4-dichlorophenyl)ethylenediamine as starting material in the above reaction scheme. The 1-(3,4-dichlorophenyl)ethylenediamine stereoisomers may be obtained from the racemic modification by standard resolution techniques. For example, the dextrorotatory stereoisomer hydrochloride of the diamine of Formula II is prepared by fractional crystallization of the (−)-diacetone-2-keto-1-gulonic acid salt with 80% ethanol to optical purity and then converting the purified diastereoisomer to (+)-4-(3,4-dichlorophenyl)ethylenediamine dihydrochloride.

An alternate preparation of optically active 1-(3,4-dichlorophenyl)ethylenediamine is depicted below wherein the asymmetric carbon atom is identified with an "*" and involves reacting 3,4-dichlorobenzaldehyde with either (+) or (−)-α-benzylamine to provide a mixture of two diastereoisomers, separating the diastereoisomeric mixture by triturating with ethanol, reducing the relatively insoluble diastereoisomeric salt to the diamine with lithium aluminum hydride which is debenzylated using a "deactivated" palladium on carbon catalyst described by Matier, et al., J. Med. Chem., 16, 901 (1973) to the enantiomeric diamines having rotations of $[\alpha]_D^{25}$ −28.2° (C=1, $H_2O$) and +28.9° (C=1, $H_2O$) as dihydrochlorides.

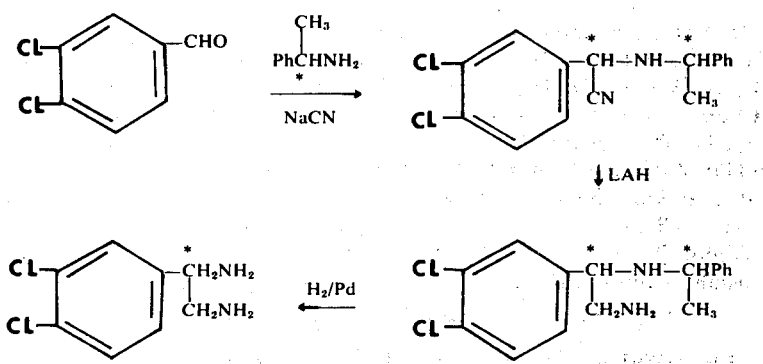

The imidazoline 4-(3,4-dichlorophenyl)-2-(methylamino-2-imidazoline of Formula I and its non-toxic pharmaceutically acceptable acid addition salts are effective as antihypertensive agents. This can be demonstrated in various antihypertensive test model systems such as the DOCA-hypertensive rat, spontaneously hypertensive rat, and the mecamylamine hypertensive dog.

In the DOCA-hypertensive rat model, hypertension is produced in Sprague Dawley male rats, weighing 90–100 grams each, by subcutaneous administration of desoxycorticosterone acetate (DOCA) at a dose of 10 mg./rat/day for 5 days each week for 3 weeks. One percent saline is provided ad libitum for the 3-week period and, at the end of the treatment period, tap water is substituted for the 1% saline. Systolic blood pressure is determined by the tail cuff method, utilizing capacitance transducers for the detection of pressure, an aneroid manometer for measuring pressure, and an oscilloscope for visualizing the disappearance and/or appearance of the pressure pulse. Groups of five rats each having a systolic blood pressure of 170 mm Hg. or greater are selected and 4-(3,4-dichlorophenyl)-2-(methylamino)-2-imidazoline subcutaneously administered as the hydrochloride salt at a dose of 5 mg./kg. body weight in sterile water at a constant volume of 2.5 ml/kg. body weight. One group serves as a control and receives the water vehicle, while another receives an antihypertensive reference agent such as guanethidine sulfate, (subcutaneous dose of 20 mg./kg. body weight) for comparative purposes. The various groups receive 4-(3,4-dichlorophenyl)-2-(methylamino)-2-imidazoline, the antihypertensive reference agent or the sterile water vehicle at daily intervals (24 hours). Blood pressure and heart rate measurements are made immediately prior to the first dose (0 time), 4, 24 (immediately prior to the second dose), 28, and 48 hours.

By plotting the percent decrease in systolic blood pressure as a function of time and determining the area under the resulting curve, a measure of the antihypertensive activity of 4-(3,4-dichlorophenyl)-2-(methylamino)-2-imidazoline quantified according to the following scale is obtained, 0 = inactive (less than 100 units),
+ = slightly active (100–300 units),
++ = active (300–500 units),
+++ = very active (500–1000 units),
++++ = extremely active (greater than 1000 units).

In the above antihypertensive rating system, 4-(3,4-dichlorophenyl)-2-(methylamino)-2-imidazoline is a very active (+++) whereas the structurally related prior art imidazoline "2-amino-4-phenyl-2-imidazoline" is inactive.

4-(3,4-Dichlorophenyl)-2-(methylamino)-2-imidazoline is also orally active in the DOCA-hypertensive rat, spontaneous hypertensive rat, and in the mecamylamine-induced hypertensive dog.

The antihypertensive process of the present invention is carried out in mammals by systemic administration of a dose of 4-(3,4-dichlorophenyl)-2-(methylamino)-2-imidazoline which is non-toxic and effective to reduce blood pressure ranging from about 0.01 to 50 mg./kg. body weight of the mammal. It is to be understood that "systemic administration" includes both the oral and parenteral routes. Examples of parenteral administration are intramuscular, intravenous, intraperitoneal, and subcutaneous administration.

The invention is illustrated but not limited by the following example.

PREPARATION OF
4-(3,4-DICHLOROPHENYL)-2-(METHYLAMINO)-2-IMIDAZOLINE HYDROCHLORIDE

2-Methylthio-4-(3,4-dichlorophenyl)-2-imidazoline hydroiodide (12.9 g., 0.033 mole) m.p. 191°–193°C., is converted to the free base by treating with an equivalent of sodium methoxide in 50 ml. of methanol. The free base is isolated by first removing the methanol solvent under reduced pressure, then dissolving the residue in ether, filtering and concentrating the filtrate. The 2-methylthio-4-(3,4-dichlorophenyl)-2-imidazoline free base thus obtained is mixed with methylamine hydrochloride (4.5 g.) in 100 ml. of isopropanol. This mixture is refluxed for a period of 30 hr., concentrated under reduced pressure, triturated with absolute ethanol to provide the crude imidazoline hydrochloride product as a solid. Treating the hydrochloride with 50% sodium hydroxide affords the imidazoline free base which is extracted with chloroform. After drying the chloroform extract over potassium carbonate, the chloroform solvent is removed and the residue taken up in ethanol and converted to the hydrochloride salt with ethanolic hydrogen chloride. Crystallization from ethyl acetate-methanol affords analytically pure 4-(3,4-dichlorophenyl)-2-(methylamino)-2-imidazoline hydrochloride, m.p. 199°–201°C. (corr.).

Analysis. Calcd. for $C_{10}H_{11}Cl_2N_3 \cdot HCl$ (percent): C, 42.80; H, 4.31; N, 14.98. Found (percent): C, 42.89; H, 4.50; N, 14.69.

What is claimed is:
1. A compound 4-(3,4-dichlorophenyl)-2-(methylamino)-2-imidazoline or a non-toxic pharmaceutically acceptable acid addition salt thereof.
2. The compound of claim 1 which is 4-(3,4-dichlorophenyl)-2-(methylamino)-2-imidazoline.
3. The compound of claim 1 which is 4-(3,4-dichlorophenyl)-2-(methylamino)-2-imidazoline hydrochloride.

* * * * *